J. H. ANDRUS.
Bee Hive.
No. 39,622.
Patented Aug. 25, 1863.
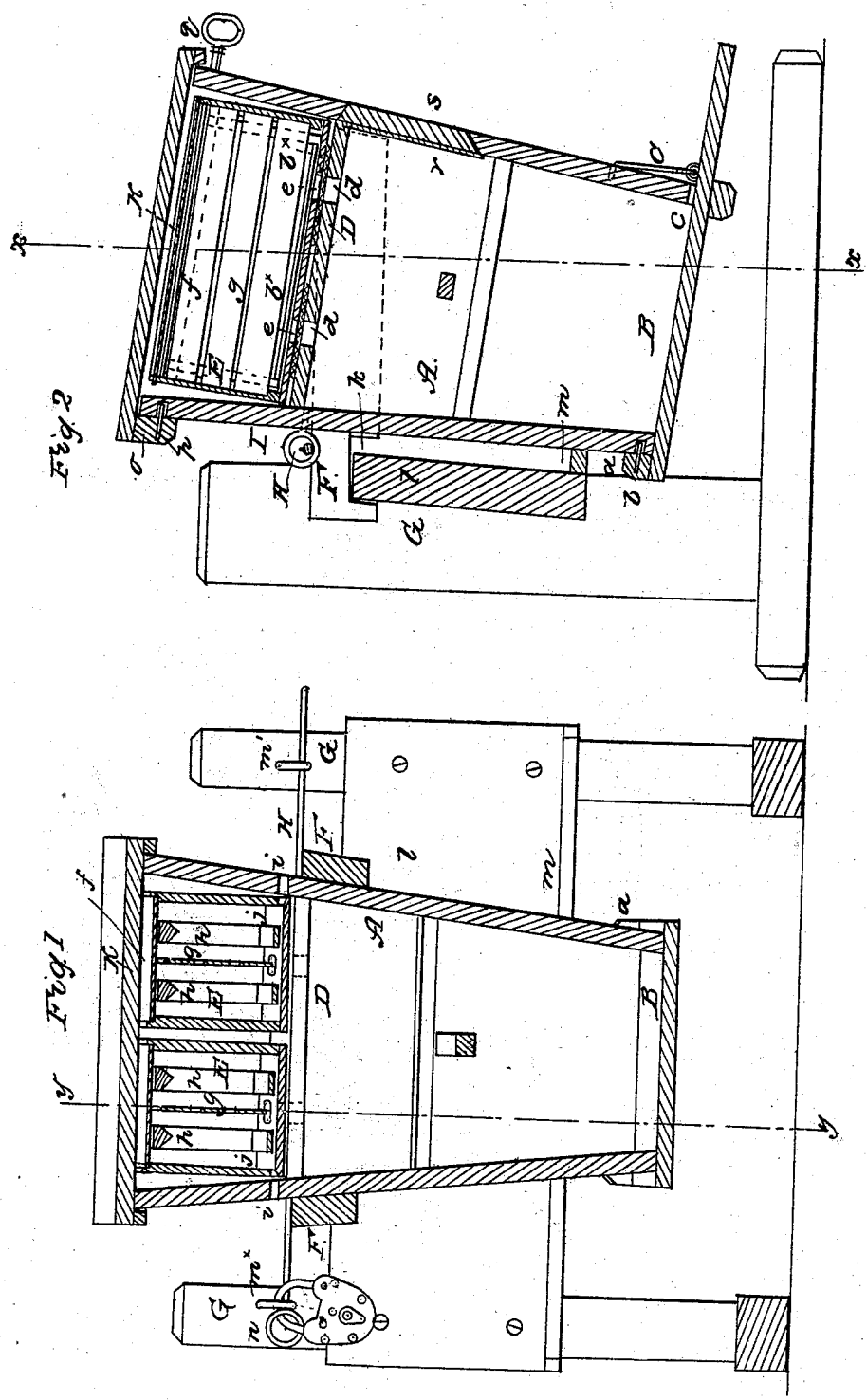

UNITED STATES PATENT OFFICE.

J. H. ANDRUS, OF ALMONT, MICHIGAN.

IMPROVEMENT IN BEE-HIVES.

Specification forming part of Letters Patent No. 39,622, dated August 25, 1863.

*To all whom it may concern:*

Be it known that I, J. H. ANDRUS, of Almont, in the county of Lapeer and State of Michigan, have invented a new and Improved Bee-Hive; and I do hereby declare that the following is a full, clear, and exact description of the same, reference being had to the accompanying drawings, making a part of this specification, in which—

Figure 1 is a vertical section of my invention, taken in the line $x\,x$, Fig. 2; Fig. 2, a vertical section of the same in the line $y\,y$, Fig. 1.

Similar letters of reference indicate corresponding parts in the two figures.

The object of this invention is to obtain a bee-hive of simple construction, which will admit, by a simple manipulation, of colonies of bees being increased without permitting them to swarm, the hive at the same time admitting of two different colonies working in it in separate compartments, and also affording facilities for the removal of old comb when necessary.

To enable those skilled in the art to fully understand and construct my invention, I will proceed to describe it.

A represents the hive, which is of quadrilateral form, and having its sides slightly inclined, so as to gradually diminish in capacity from its upper to its lower end, as shown in both figures, so that the lower end of one hive can be inserted within the top of another when necessary. This hive A is provided with a bottom board, B, having a cleat, $a$, attached to its upper surface at its back end, and into the inner side of this cleat two pins, $b$, are driven, one near each end, said pins passing into the back of the hive and securing thereto the back part of the bottom board, B, the first part of said board being secured by a hook, C. A recess, $c$, is made in the lower edge of the front side of the hive to form a bee-entrance, and the front part of the bottom board, B, extends some distance in front of the hive to serve as an alighting-board, as shown clearly in Fig. 2.

Within the hive A there is secured a partition-plate, D, having holes $d$ made in it to admit bees into boxes E E, the latter having holes $e$ made in their bottoms to allow the bees to pass into them. These boxes E E are placed side by side, are provided with sliding glass covers $f$, and are each divided into two compartments by a slatted partition, $g$, the lower edges of which are directly over the centers of the holes $d$ in the bottoms of the boxes, so that the bees can pass into both compartments of each box through the same holes $d$. The compartment of each box E is provided with a comb-frame, $h$. In two opposite sides of the hive A, just above the partition D, there are made openings $i$, and similar openings, $j$, are made in the sides of the boxes E, in line with or opposite to the openings $i$. (See Fig. 1.) To two opposite sides of the hive A there are firmly secured bars F F, a bar being put below each opening $i$.

The hive A is provided with a lid or cover, K, to one end of which a cleat, $o$, is attached, having two pins, $p\,p$, driven into it, one near each end. These pins $p$ pass into the back of the hive A, (see Fig. 2,) and cleats $q$, at the sides and front edge of the lid K, fit over the front side of the hive. This lid or cover may be secured on the hive by means of a lock and key. At the front side of the hive there is a glass, P, over which a slide, S, is fitted.

In order to hive a new colony of bees, the lid or cover K of an empty hive is removed, the boxes E taken therefrom, and the hive from which the swarm is to be taken fitted therein. The bees in the uninhabited hive having no egress but through the empty one will pass down therein and soon commence to build combs, and when sufficient progress has been made in the building of combs and the storing of honey therein, and the requisite number of bees are in the new hive, the old one may be removed and placed upon another empty hive, or they may be allowed to work in the boxes E, the latter being placed in the proper position in the partition D and cut off from the compartment below by inserting pieces of wire-cloth $b^x$ between the holes $d\,e$. The bees passing in and out through the openings $i\,j$ are thus forced to go through the boxes, and will at once commence to fill them. In case old comb requires to be removed from a hive, all the bees are allowed to pass down into the hive below it, and when the old hive is empty of bees the front side, which is attached by screws, is removed and the old comb may be taken out without any difficulty whatever.

The lid or cover K and bottom board, B, may be detached from the hive and attached thereto without any difficulty whatever.

Having thus described my invention, what

I claim as new, and desire to secure by Letters Patent, is—

1. A hive provided with a partition, D, having holes $d$ made in it, in combination with the boxes E E, provided with holes $e$ in their bottoms and openings $j$ in their sides, in line with openings $i$ in the sides of the hive, all arranged substantially as and for the purpose set forth.

2. The manner of securing the back part of the lid or cover K and bottom board, B, to the hive A, as shown and described—to wit, by having said parts provided, respectively, with cleats $o$ $a$, having pins $b$ $p$ driven in them, which fit into the back of the hive.

J. H. ANDRUS.

Witnesses:
H. D. FITCH,
JOHN B. HOUGH.